US012684481B2

(12) United States Patent　　　(10) Patent No.:　US 12,684,481 B2
Hathiramani et al.　　　　　　　(45) Date of Patent:　　　Jul. 14, 2026

(54) REDUCING UE AWAKE TIME AFTER WUS RECEPTION FOR NON-PAGED UES

(71) Applicant: Nokia Technologies Oy, Espoo (FI)

(72) Inventors: Navin Hathiramani, Coppell, TX (US); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 420 days.

(21) Appl. No.: 18/376,054

(22) Filed: Oct. 3, 2023

(65) Prior Publication Data

US 2025/0113301 A1　　Apr. 3, 2025

(51) Int. Cl.
*H04W 52/02*　　　(2009.01)
*H04W 68/00*　　　(2009.01)

(52) U.S. Cl.
CPC ..... *H04W 52/0229* (2013.01); *H04W 68/005* (2013.01)

(58) Field of Classification Search
None
See application file for complete search history.

(56) References Cited

U.S. PATENT DOCUMENTS

2020/0059862 A1 * 2/2020 Wong ................... H04W 76/27
2020/0344718 A1 10/2020 Ozturk et al.

2021/0377865 A1 12/2021 Koskinen et al.
2022/0104173 A1 3/2022 Shi et al.
2022/0240078 A1 7/2022 Park et al.

OTHER PUBLICATIONS

"3rd Generation Partnership Project; Technical Specification Group Radio Access Network; Study on low-power wake up signal and receiver for NR (Release 18)", 3GPP TR 38.869 V0.2.0, May 2023, 33 pages.
"3rd Generation Partnership Project; Technical Specification Group Radio Access Network; NR; Radio Resource Control (RRC) protocol specification (Release 17)", 3GPP TS 38.331 V17.5.0, Jun. 2023, 1328 pages.

* cited by examiner

*Primary Examiner* — Gary Lafontant
(74) *Attorney, Agent, or Firm* — Lippes Mathias LLP

(57)　　　　　ABSTRACT

A UE in a sleep state receives a WUS and monitors paging occasion(s). The monitoring includes: receiving a paging message; determining the received paging message is not addressed to the UE; and determining whether another paging occasion should be monitored based at least on paging records in the paging message. The UE reenters the sleep state in response to a determination it is not necessary to monitor another paging occasion. A network node receives, from a UE, indication of a capability to transition out of a sleep state via a WUS to return to a sleep state based on paging message monitoring. The network node determines, based on the capability and on a need to transmit a paging message to the user equipment, a sleep state of the user equipment, and transmits to the UE either a wake up signal or paging message based on the determined sleep state.

19 Claims, 5 Drawing Sheets

REDUCING UE AWAKE TIME AFTER WUS RECEPTION FOR NON-PAGED UES

TECHNICAL FIELD

Examples of embodiments herein relate generally to wireless communications and, more specifically, relate to user equipment (UE) away time in response to receiving a wake up signal (WUS).

BACKGROUND

In order to save power, a user equipment (UE), which is a wireless and typically mobile device that is able to connect to a wireless network, will enter into a low power state, such as a deep sleep state. In the deep sleep state in particular, a special receiver is used, referred to as a Low Power (LP) wake up receiver, which is engineered to have ultra-low power consumption. This allows the UE to enter the deep sleep state, because the main receiver of the UE can be placed in a very low power state or turned off, as can other devices (e.g., certain transmitter(s)). The deep sleep state, however, maintains the ability for the LP wake up receiver to determine whether the UE has received a Wake Up Signal (WUS). In response to the detection of the WUS by the LP wake up receiver, the UE could then wake up its main receiver, thereby resuming normal operation at least for reception. This allows the UE to receive paging messages, for example.

While deep sleep states are enabled by technologies such as the LP wake up receiver, there are also challenges in this area.

BRIEF SUMMARY

This section is intended to include examples and is not intended to be limiting.

In an exemplary embodiment, a method is disclosed that includes receiving, by a user equipment in a sleep state, a wake up signal; monitoring, by the user equipment responsive to reception of the wake up signal, one or more paging occasions, the monitoring comprising: receiving a paging message; determining the received paging message is not addressed to the user equipment; and determining whether another paging occasion should be monitored based at least on paging records in the paging message; and reentering by the user equipment the sleep state in response to a determination it is not necessary to monitor another paging occasion.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: receiving, by a user equipment in a sleep state, a wake up signal; monitoring, by the user equipment responsive to reception of the wake up signal, one or more paging occasions, the monitoring comprising: receiving a paging message; determining the received paging message is not addressed to the user equipment; and determining whether another paging occasion should be monitored based at least on paging records in the paging message; and reentering by the user equipment the sleep state in response to a determination it is not necessary to monitor another paging occasion.

An exemplary computer program product includes a computer-readable storage medium bearing instructions that, when executed by an apparatus, cause the apparatus to perform at least the following: receiving, by a user equipment in a sleep state, a wake up signal; monitoring, by the user equipment responsive to reception of the wake up signal, one or more paging occasions, the monitoring comprising: receiving a paging message; determining the received paging message is not addressed to the user equipment; and determining whether another paging occasion should be monitored based at least on paging records in the paging message; and reentering by the user equipment the sleep state in response to a determination it is not necessary to monitor another paging occasion.

In another exemplary embodiment, an apparatus comprises means for performing: receiving, by a user equipment in a sleep state, a wake up signal; monitoring, by the user equipment responsive to reception of the wake up signal, one or more paging occasions, the monitoring comprising: receiving a paging message; determining the received paging message is not addressed to the user equipment; and determining whether another paging occasion should be monitored based at least on paging records in the paging message; and reentering by the user equipment the sleep state in response to a determination it is not necessary to monitor another paging occasion.

In an exemplary embodiment, a method is disclosed that includes receiving, at a network node from a user equipment, indication of a capability to transition out of a sleep state via a wake up signal to return to a sleep state based on paging message monitoring; determining, by the network node based on the capability and on a need to transmit a paging message to the user equipment, a sleep state of the user equipment; and transmitting, by the network node to the user equipment, either a wake up signal or paging message based on the determined sleep state.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: receiving, at a network node from a user equipment, indication of a capability to transition out of a sleep state via a wake up signal to return to a sleep state based on paging message monitoring; determining, by the network node based on the capability and on a need to transmit a paging message to the user equipment, a sleep state of the user equipment; and transmitting, by the network node to the user equipment, either a wake up signal or paging message based on the determined sleep state.

An exemplary computer program product includes a computer-readable storage medium bearing instructions that, when executed by an apparatus, cause the apparatus to perform at least the following: receiving, at a network node from a user equipment, indication of a capability to transition out of a sleep state via a wake up signal to return to a sleep state based on paging message monitoring; determining, by the network node based on the capability and on a need to transmit a paging message to the user equipment, a sleep state of the user equipment; and transmitting, by the network node to the user equipment, either a wake up signal or paging message based on the determined sleep state.

In another exemplary embodiment, an apparatus comprises means for performing: receiving, at a network node from a user equipment, indication of a capability to transition out of a sleep state via a wake up signal to return to a sleep state based on paging message monitoring; determining, by the network node based on the capability and on a need to transmit a paging message to the user equipment, a sleep state of the user equipment; and transmitting, by the network node to the user equipment, either a wake up signal or paging message based on the determined sleep state.

DETAILED DESCRIPTION OF THE DRAWINGS

Figure 1:
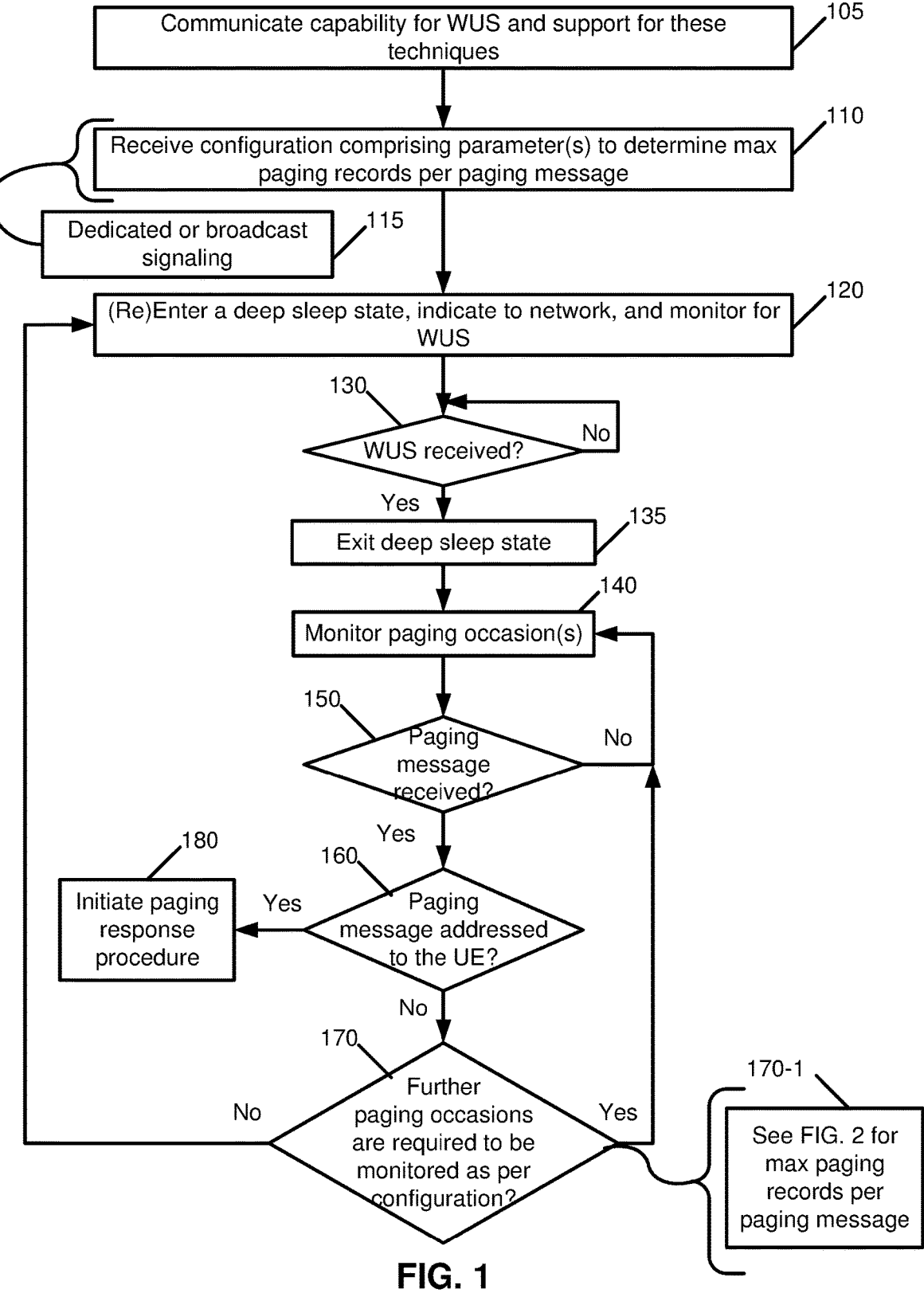
FIG. 1 is a flowchart from the UE's perspective of reducing UE awake time after WUS reception for non-paged UEs.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both". As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Any flow diagram (see FIGS. 1, 2, 3, and 3A) or signaling diagram herein is considered to be a logic flow diagram, and illustrates the operation of an exemplary method, results of execution of computer program instructions embodied on a computer readable memory, functions performed by logic implemented in hardware, and/or interconnected means for performing functions in accordance with an exemplary embodiment. Block diagrams (such as FIG. 4) also illustrate the operation of an exemplary method, results of execution of computer program instructions embodied on a computer readable memory, functions performed by logic implemented in hardware, and/or interconnected means for performing functions in accordance with an exemplary embodiment.

3GPP discussions are on-going to enable deeper sleep modes within a UE via the use of Low Power (LP) wake up receivers in the UE. These LP receivers would monitor for the detection of Wake Up Signals (WUS) and upon the detection of these, the UE could wake up (at least) their main receiver to resume normal operation.

From the 3GPP TR 38.869 (see 3GPP TR 38.869 V0.2.0 (2023-05)) study item, see the following (between opening and closing quotations):

"Currently, UEs need to periodically wake up once per DRX cycle, which dominates the power consumption in periods with no signaling or data traffic. If UEs are able to wake up only when they are triggered, e.g., paging, power consumption could be dramatically reduced. This can be achieved by using a wake-up signal to trigger the main radio and a separate receiver which has the ability to monitor wake-up signal with ultra-low power consumption. Main radio works for data transmission and reception, which can be turned off or set to deep sleep unless it is turned on.

The power consumption for monitoring wake-up signal depends on the wake-up signal design and the hardware module of the wake-up receiver used for signal detecting and processing.

The study should primarily target low-power WUS/WUR for power-sensitive, small form-factor devices including IoT use cases (such as industrial sensors, controllers) and wearables. Other use cases are not precluded, e.g. XR/smart glasses, smart phones.

As opposed to the work on UE power savings in previous releases, this study will not require existing signals to be used as WUS. All WUS solutions identified shall be able to operate in a cell supporting legacy UEs. Solutions should target substantial gains compared to the existing Rel-15/16/17 UE power saving mechanisms. Other aspects such as detection performance, coverage, UE complexity, should be covered by the evaluation.

The study item includes the following objectives:

Identify evaluation methodology (including the use cases) & KPIs [RAN1]

Primarily target low-power WUS/WUR for power-sensitive, small form-factor devices including IoT use cases (such as industrial sensors, controllers) and wearables Other use cases are not precluded Study and evaluate low-power wake-up receiver architectures [RAN1, RAN4]

Study and evaluate wake-up signal designs to support wake-up receivers [RAN1, RAN4]

Study and evaluate L1 procedures and higher layer protocol changes needed to support the wake-up signals [RAN2, RAN1]

Study potential UE power saving gains compared to the existing Rel-15/16/17 UE power saving mechanisms, the coverage availability, as well as latency impact of low-power WUR/WUS. System impact, such as network power consumption, coexistence with non-low-power-WUR UEs, network coverage/capacity/resource overhead should be included in the study [RAN1]

Note: The need for RAN2 evaluation will be triggered by RAN1 when necessary.

Use the following terminology for future discussion,

Main radio (MR): the Tx/Rx module operating for NR signals/channels apart from signals/channel related to low-power wake-up LP-WUR (LR): The Rx module operating for receiving/ processing signals/channel related to low-power wake-up."

That ends the description from 3GPP TR 38.869.

Issues in this technology area include the following. A Wake Up Signal (WUS) can be common for a group of UEs. Thus, when any UE within the group needs to be paged via the WUS, the page to the UE will result in waking up the main receiver of all the UEs in the group. This will lead to a disruption of the deep sleep state of many UEs in the WUS group, even though they are not being paged.

A method could be implemented to ensure that UEs that are not going to be paged but are within the same WUS group as others can return to sleep state as soon as possible. This return to a deep sleep state could improve (e.g., minimize) the disruption of having larger WUS groups and allow UEs which are not targeted for paging to quickly return to a deep sleep state, allowing the UE to operate more energy efficiently.

An overview is provided now, and further details are described below. One example that addresses issues described above is the following. A framework is disclosed, via which a UE can determine how much time the UE needs to maintain its main Receiver (RX) active after receiving a WUS.

A high-level description of the framework includes one or more of the following.

1) The NW may configure the UE with parameters such as a maximum number of paging records per paging message to monitor upon WUS detection.

2) The UE, upon receiving WUS, starts monitoring its configured paging occasions.

3) Based on the received paging message, not being addressed to the UE, the UE determines whether to further monitor additional paging occasions as per the configuration received in (1) above.

a) In an embodiment, the decision to further monitor is based on the number of paging records in the paging message, where the max/threshold number of paging messages (e.g., number of entries in pagingRecordList) can be provided (e.g., dedicated or broadcast) via configuration by the gNB, or determined by the UE based on, e.g., a coding rate of a paging message and the paging record size:

i) If in the detected paging message, the number of paging records <(is less than) a MAX/threshold paging records per message, then the UE can assume that the UE is not going to be paged for a given time/number of DRX cycles and is, e.g., allowed return the MR to a power-saving state, e.g., deep sleep state or ultra-deep sleep state.

ii) If the detected paging message has a number of paging records that is equal to, e.g., a MAX/threshold paging records, and the paging records are different from previous paging messages, the UE is expected to continue to monitor the paging occasions with its MR, i.e., stay awake.

iii) It could be further defined that, if a detected paging message has a number of paging records that is equal to a MAX paging records and the paging records are the same as from previous message, the UE is allowed to return the MR to power saving state, i.e., deep sleep state.

As is known, dedicated signaling is signaling directed to a single UE, while broadcast signaling is directed to multiple UEs (e.g., all UEs) via a transmission from the network.

It is noted that the UE could also transition to deep sleep between paging occasions. There may be a dependency on UE and DRX cycle here. For these cases, the methods used herein establish whether the UE should power the main receiver on for paging occasion monitoring.

Now that an overview has been provided, more details are provided. At this juncture, it is useful to provide several definitions of terms used herein. In addition to the description previously provided about sleep states, a sleep state herein is also considered to be a state where the UE's main receiver (at least) is assumed to be in a power saving mode and not used for reception and (in some implementations) another, low power receiver is used to monitor/receive a wake-up signal. The awake state is a state there the UE main receiver (at least) is used to monitoring/receive the paging messages and the low power receiver, if used, can be powered off or set in sleep state.

FIG. 1 provides a flowchart from the UE's perspective of reducing UE awake time after WUS reception for non-paged UEs. That is, for a UE that is not paged, the UE can end monitoring of paging sessions based on a one or more parameters that were configured prior to monitoring. Ending the monitoring will reduce the UE awake time as compared to UEs that do not use or meet the parameters. In block 110, a UE receives from the network configuration comprising parameter(s) indicating information to determine a maximum number of paging records per paging message. The parameters may be indicated using dedicated or broadcast signaling in block 115. In block 120, the UE can cease monitoring paging messages and can enter into a power saving state to preserve energy, e.g., deactivating its main RX and enabling its LP-Wake Up receiver. The UE in block 130 determines whether a WUS was received, e.g., using its LP-Wake Up receiver, and if not (block 130=No) waits for the same. Upon detection of a WUS in block 130 (block 130=Yes), the UE exits (block 135) the deep sleep state by, e.g., enabling its main RX and starts to monitor its paging occasion(s). The UE monitors a paging occasion for a paging message in block 140. If during the paging occasion a paging message is received (block 150=Yes), if the paging message is addressed to the UE in block 160, the UE proceeds to respond to the paging as per initiating a paging response procedure, see block 180. If the paging message is not addressed to the UE (block 160=No), the UE determines based on the configuration and its corresponding parameters whether the UE needs to monitor further paging occasions prior to returning to the deep sleep state, see block 170. If the UE determines (block 170=Yes) based on the parameter(s) that further paging occasions are required to be monitored, the flow proceeds to block 140 where another paging occasion is monitored; otherwise (block 170=No), the flow proceeds to block 120, and the UE (re)enters a deep sleep state.

Figure 2:
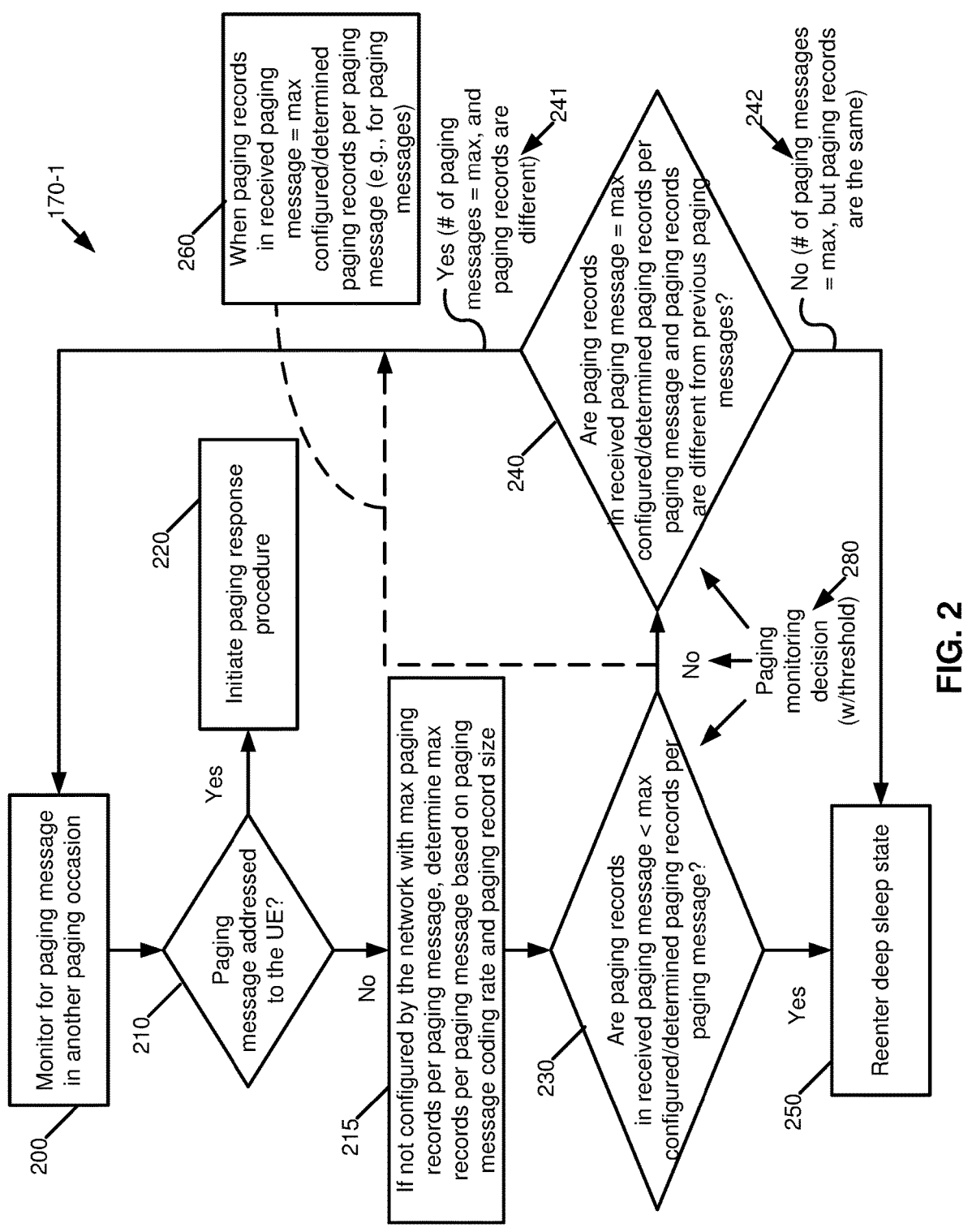
FIG. 2 provides a UE flowchart for an embodiment in which the determination to return to (e.g., deep) sleep state is based on the number of paging records in a paging message.

Note that for block 170, one option is to perform block 170-1, where further paging occasions are required to be monitored using a max (maximum) paging records per paging message, which is illustrated in more detail in FIG. 2.

FIG. 2 provides a UE flow chart for an embodiment in which the determination to return to (e.g., deep) sleep state is based on the number of paging records in a paging message. 3GPP TS 38.331 allows for a maximum of 32 paging records per paging message (see maxNrofPageRec in section 6.4 of 3GPP TS 38.331 V17.5.0 (2023-06), and section 5.3 also), however the actual number of paging records per paging message is configurable based on the desired coding rate and the bandwidth available for paging. A UE may determine that the UE can return to a deep sleep state if the UE detects a paging message in its paging occasion and the number of paging records in the paging message are less than a max (maximum) established by the network, as in the following.

In block 200, the UE monitors for a paging message (similar to block 140 of FIG. 1) and the UE determines in block 210 whether a paging message is addressed to the UE. If so (block 210=Yes), then in block 220, the UE initiates a paging response procedure. See also blocks 160 and 180 of FIG. 1. If not (block 210=No), in block 215, the UE, if not configured by the network with max paging records per paging message, determines the max records per paging message based on paging message coding rate and paging record size. The max paging records per paging message can be explicitly configured by the network (see, e.g., block 110 of FIG. 1), or the network could provide some assistance information for UE to determine the max paging records per paging message based, e.g., on the PRBs and the coding rate used for scheduling the paging as in block 215.

In block 230, the UE determines whether paging records in the received paging message <(are less than) max configured/determined paging records per paging message (that is, the maximum number of paging records for paging messages). If so (block 230=Yes), the UE renters the deep sleep state (block 250, which corresponds to block 120 of FIG. 2). If not (block 230=No), the flow proceeds to block 240, where the UE determines whether paging records in the received paging message=(are equal to) the max configured/determined paging records per paging message and paging records are different from previous paging messages. If the number (#) of paging messages=max, but paging records are the same (that is, not different) (block 240=No in path 242), the UE in block 250 returns to the deep sleep state. If the number (#) of paging messages=max, and the paging records are different (block 240=Yes in path 241), the flow proceeds to block 200, where the UE monitors for another paging message in another paging occasion (e.g., as in block 140 of FIG. 1). Note that if all the paging records in a paging message are used by the network and none are targeted to the UE, the UE would need to monitor a further paging occasion to determine if the UE is being paged. A special case of this scenario is when the NW is (re)sending a re-paging and all the paging records are the same as a previous paging message. In this case, the UE could return to deep sleep state.

A further option is illustrated by block 260, which when used performs the following. In response to the number of paging records in received paging message=max configured/determined paging records per paging message (that is, the maximum number of paging records for paging messages), the UE can return to monitoring for another paging message in another paging occasion as in block 200 (which is similar to block 140 of FIG. 1). This example does not require the paging messages to be the same in current and previous paging messages for monitoring another paging occasion, as required instead by block 240.

It is also noted that one or more of blocks 230, 240, or 260 can be considered to be a paging monitoring decision 280. The paging monitoring decision 280 uses, in one example, the number of paging records in the paging message that is configured by the network and is used as a threshold (indicated by with threshold, "w/threshold") to determine whether paging should or should not be monitored.

Figure 3:
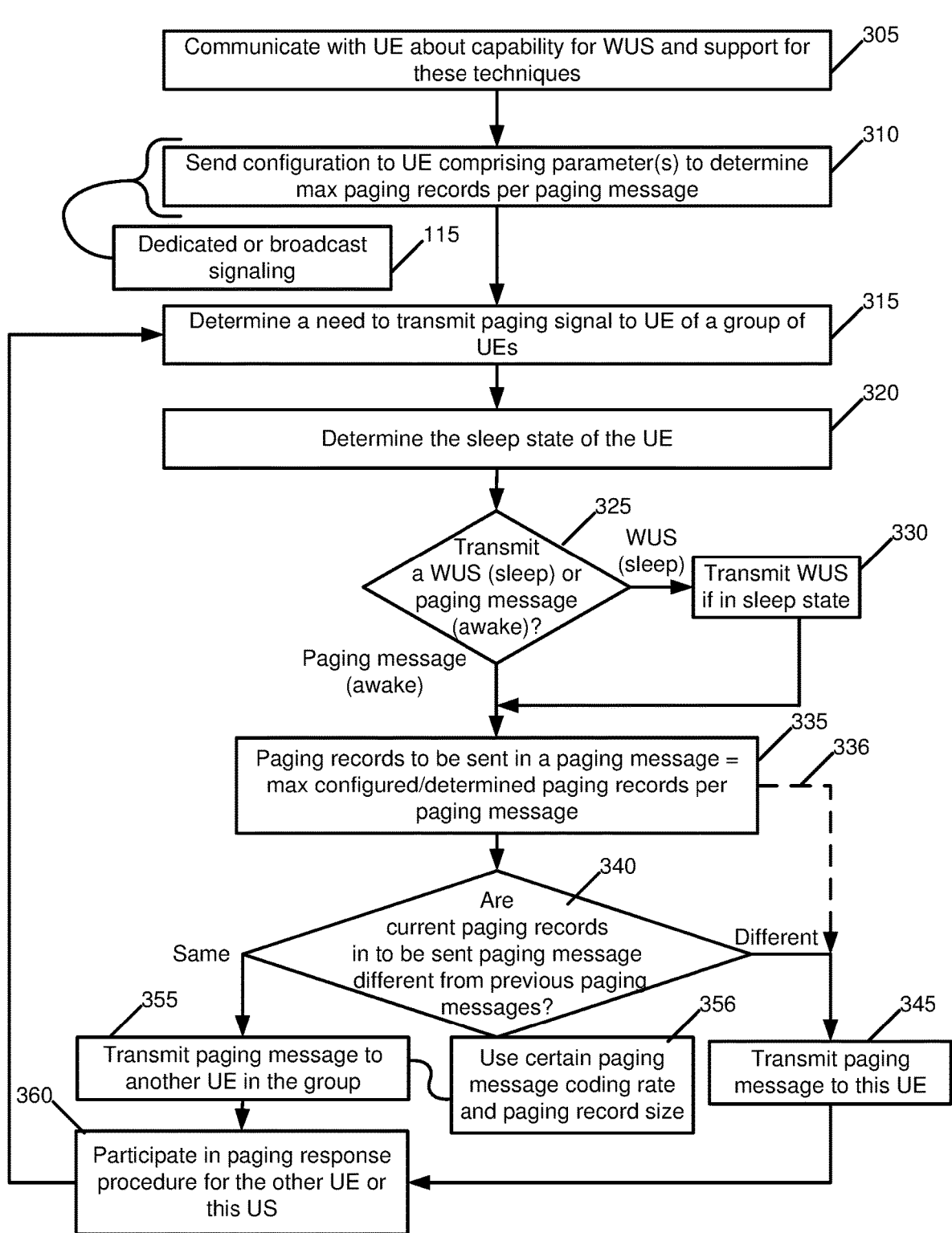
FIG. 3 is a flowchart from a network node's perspective of paging UEs while considering the sleep state of one of the UEs.

Turning to FIG. 3, this figure is a flowchart from a network node's perspective of paging UEs while considering the sleep state of one of the UEs. The network node can be the base station 70, as an access node, or another network node that forms part of the base station 70, such as a distributed unit or central unit (or both in communication). Block 305 is similar to block 105 in FIG. 1, and in this block, the network node communicates with the UE about capability for WUS and support for these techniques. This flow assumes the UE has reported capability for WUS and support for these techniques. In block 310, the network node sends configuration to the UE comprising parameter(s) to determine max paging records per paging message. As previously indicated by block 115, this can be through dedicated or broadcast signaling. It is also noted that another option for this is for the UE to determine max records per paging message. This would be based on the network node in block 356 using certain paging message coding rate and paging record size (for a paging message transmitted to another UE in block 355) so in block 215 of FIG. 2, the UE can make this determination.

In block 315, the network node determines a need to transmit a paging signal to a UE of a group of UEs. In block 320, the network node determines the sleep state of the UE (e.g., via reception of the indication from the UE in block 120 of FIG. 1). In block 325, the network node determines whether to transmit WUS (if the UE is in a sleep state) or a paging message (if the UE is in an awake state) based on the determined sleep state. If the UE is in the sleep state, the "WUS (sleep)" path is taken and the network node transmits the WUS in block 330. If the UE is in an awake state, the "paging message (awake)" path proceeds to block 335. In this example, the criterion in block 230 of FIG. 2 is being ignored.

In block 335, the network node creates paging records to be sent in a paging message=max configured/determined paging records per paging message. Path 336 is similar to the path that leads to block 260 in FIG. 2, and provides another path to page the UE in this example. In block 340 the network node is configured to determine whether current paging records in to be sent paging message will be different from previous paging messages. If different (block 340=different), the network node transmits (block 345) a paging message to the UE and would subsequently participate in a paging response procedure for the other UE in block 360. Flow proceeds back to block 315. If the same (block 340=same), the network node transmits a paging message to another UE in the group in block 355, participates in a paging response procedure for this other UE in block 360, and, since the UE was not paged in this example, the flow proceeds to block 315.

Figure 3A:
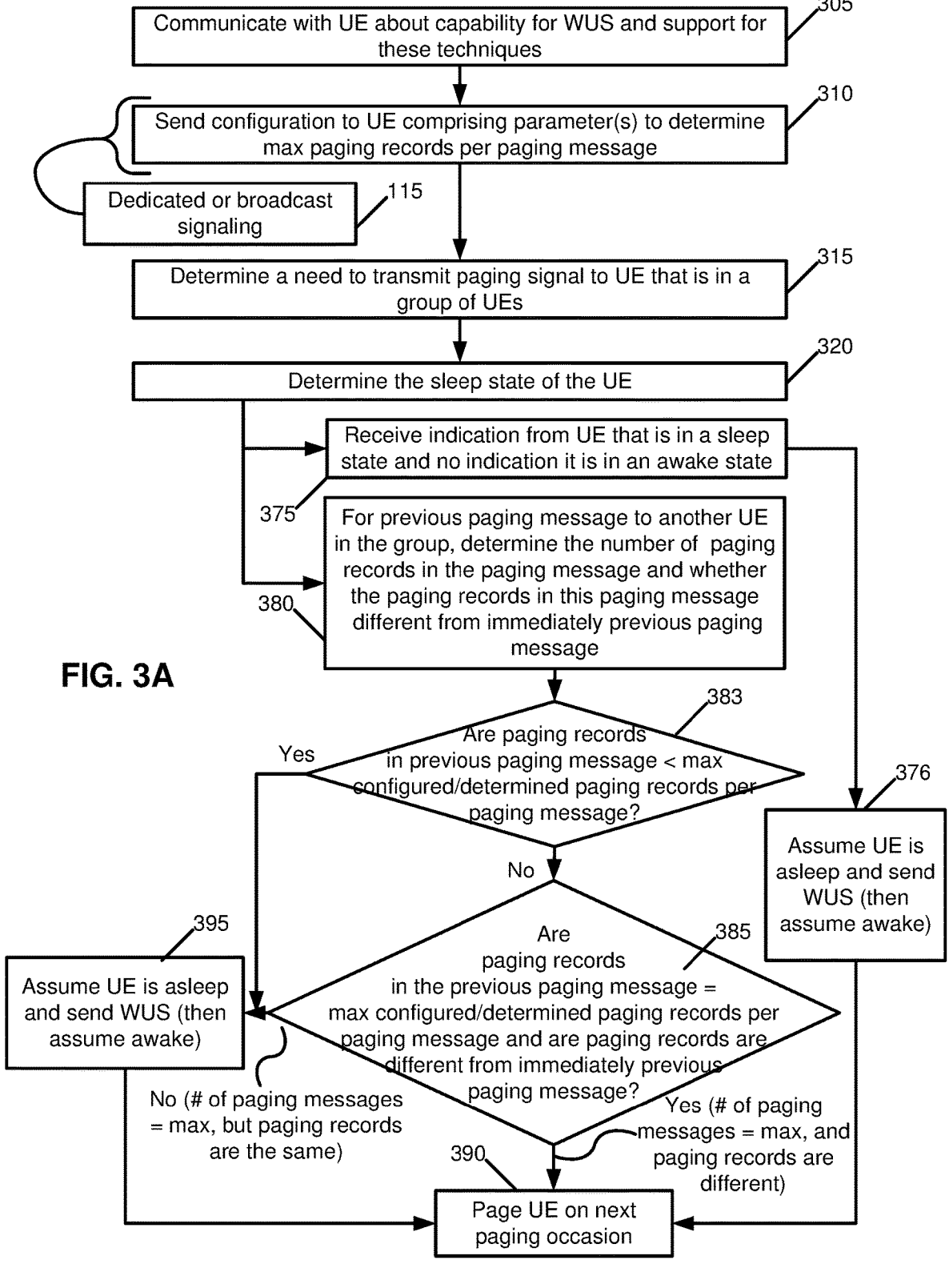
FIG. 3A is a flowchart from a network node's perspective that is similar to FIG. 3 but concentrates on determining the status of the UE to determine whether to wake up the UE for paging.

Turning to FIG. 3A, this figure is a flowchart from a network node's perspective that is similar to FIG. 3 but concentrates on determining the status of the UE to determine whether to wake up the UE for paging. Blocks 305 to 320 are the same as in FIG. 3. For determining the sleep state of the UE, one option is block 375, where the network node receives indication from UE that the UE is in a sleep state and no indication the UE is in an awake state. For this example, block 376 is performed by the network node is assumed to be asleep, so a WUS is sent by the network node toward the UE. After the WUS is sent, the network node assumes the UE will be in the awake state. In block 390, the network node pages this UE on the next paging occasion, since the UE should be listening for paging.

Another option starts at block 380. In this block, the network node, for previous paging message to another UE in the group, determines the number of paging records in the paging message and whether the paging records in this paging message are different from previous paging messages. This block, along with blocks 380 and 385, are akin to blocks 230 and 240 of FIG. 2. In block 383, the network node determines whether paging records in the (immediately) previous paging message <max configured/determined paging records per paging message. If so (block 383=Yes), in block 395, the network node assumes the UE is asleep (see blocks 230 and 250 of FIG. 2), and sends a WUS. After the WUS is sent, the network node assumes the UE will be in the awake state. The flow proceeds to block 390, where the network node pages the UE on a next paging occasion.

If block 383=No, in block 385, the network node determines whether paging records in the previous paging message=max configured/determined paging records per paging message and whether paging records are different from previous paging messages. In other words, the previous paging message has first paging records, and the paging message transmitted before that one has second paging records. If the first paging record is sent in one paging occasion, the second paging record is sent in a paging record occurring before that one (i.e., preceded in time) and without another paging occasion occurring between the two paging occasions. The first and second paging records are compared. If block 385=Yes (# of paging messages=max, and paging records are different), the UE is assumed to be monitoring for another paging occasion (see blocks 240 and 200 of FIG. 2, along with path 241), the network node pages the UE on the next paging occasion in block 390.

If block 385=No (# of paging messages=max, but paging records are the same), the network node assumes the UE is asleep (see blocks 240 and 250 of FIG. 2, along with pate 242), and sends a WUS in 395, then pages the UE on the next paging occasion in block 390.

Figure 4:
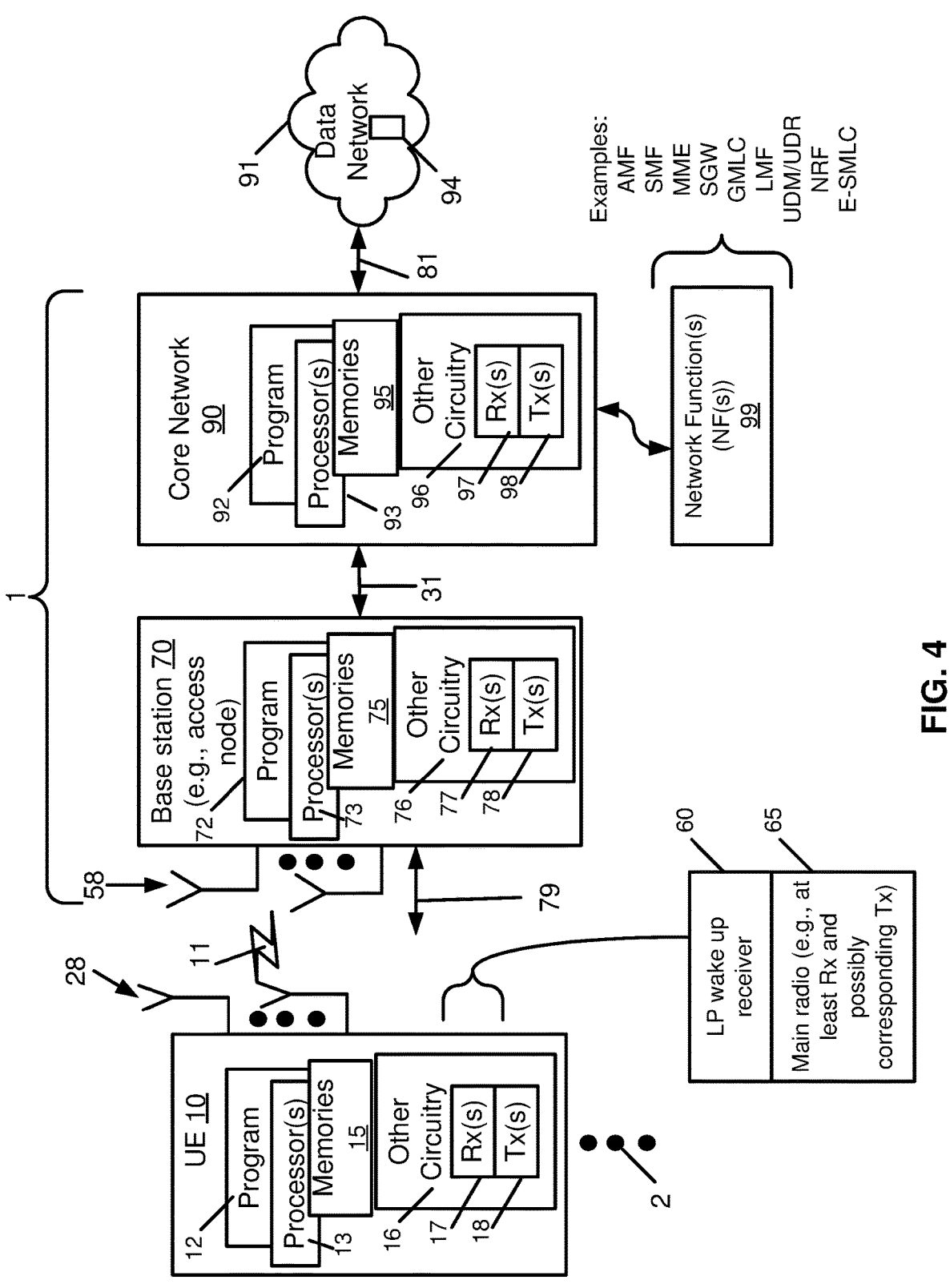
FIG. 4 is a block diagram of one possible and non-limiting exemplary system in which the exemplary embodiments may be practiced.

Turning to FIG. 4, this figure shows a block diagram of one possible and non-limiting example of a cellular network 1 that is connected to a user equipment (UE) 10. A number of network elements are shown in the cellular network of FIG. 4: a base station 70; and a core network 90.

In FIG. 4, a user equipment (UE) 10 is in wireless communication via radio link 11 with the base station 70 of the cellular network 1. A UE 10 is a wireless communication device, such as a mobile device, that is configured to access a cellular network. The UE 10 is illustrated with one or more antennas 28. The ellipses 2 indicate there could be multiple UEs 10 in wireless communication via radio links with the base station 70. The UE 10 includes one or more processors 13, one or more memories 15, and other circuitry 16. The other circuitry 16 includes one or more receivers (Rx(s)) 17 and one or more transmitters (Tx(s)) 18. A program 12 is used to cause the UE 10 to perform the operations described herein. For a UE 10, the other circuitry 16 could include circuitry such as for user interface elements (not shown) like a display.

The other Rx(s) 17 could include an LP wake up receiver 60 and a main radio 65. When the UE 10 is in the deep sleep state, the main radio 65 (which includes the main Rx from Rx(s) 17 and may include a corresponding Tx from Tx(s) 18) would be in low power mode, e.g., turned off, while the LP wake up receiver 60 will be looking for a WUS. In response to receiving the WUS, the LP wake up receiver 60 can alert the one or more processors 13, which can be programmed per the program 12 to cause the UE to enter a higher power stated and enable at least the main receiver 65.

The base station 70, as a network element of the cellular network 1, provides the UE 10 access to cellular network 1 and to the data network 91 via the core network 90 (e.g., via a user plane function (UPF) of the core network 90). the base station 70 may be thought of as an access node or another network node that provides access by UEs 10 to the cellular network 1. As described below, there are multiple network nodes that can be used for communication with UEs 10. The base station 70 is illustrated as having one or more antennas 58. In general, the base station 70 may be referred to as RAN node 70, although many will make reference to this as a gNB (gNode B, a base station for NR, new radio) instead. There are, however, many other examples of RAN nodes including an eNB (evolved Node B) or TRP (Transmission-Reception Point). The base station 70 includes one or more processors 73, one or more memories 75, and other circuitry 76. The other circuitry 76 includes one or more receivers (Rx(s)) 77 and one or more transmitters (Tx(s)) 78. A program 72 is used to cause the base station 70 to perform the operations described herein. The base station 70 may also be implemented by multiple network nodes, such as radio units and corresponding distributed units, central units, remote radio heads and corresponding baseband units, and the like.

It is noted that the base station 70 may instead be implemented via other wireless technologies, such as Wi-Fi (a wireless networking protocol that devices use to communicate without direct cable connections) or other wireless technology. In the case of Wi-Fi, the link 11 could be characterized as a wireless link.

Two or more base stations 70 communicate using, e.g., link(s) 79. The link(s) 79 may be wired or wireless or both and may implement, e.g., an Xn interface for 5G (fifth generation), an X2 interface for LTE (Long Term Evolution), or other suitable interface for other standards.

The cellular network 1 may include a core network 90, as a third illustrated element or elements, that may include core network functionality, and which provide connectivity via a link or links 81 with a data network 91, such as a telephone network and/or a data communications network (e.g., the Internet). The core network 90 includes one or more processors 93, one or more memories 95, and other circuitry 96. The other circuitry 96 includes one or more receivers (Rx(s)) 97 and one or more transmitters (Tx(s)) 98. A program 92 is used to cause the core network 90 to perform the operations described herein.

The core network 90 could be a 5GC (5G core network). The core network 90 can implement or comprise multiple network functions (NF(s)) 99, and the program 92 may comprise one or more of the NFs 99. A 5G core network may use hardware such as memory and processors and a virtualization layer. It could be a single standalone computing system, a distributed computing system, or a cloud computing system. The NFs 99, as network elements, of the core network could be containers or virtual machines running on the hardware of the computing system(s) making up the core network 90.

Core network functionality for 5G may include access and mobility management functionality that is provided by a network function 99 such as an access and mobility management function (AMF(s)), session management functionality that is provided by a network function such as a session management function (SMF). Core network functionality for access and mobility management in an LTE (Long Term Evolution) network may be provided by an MME (Mobility Management Entity) and/or SGW (Serving Gateway) functionality, which routes data to the data network. Many others are possible, as illustrated by the examples in FIG. 4: AMF; SMF; MME; SGW; GMLC (Gateway Mobile Location Center); LMF (Location Management Function); UDM (Unified Data Management)/UDR (Unified Data Repository); NRF (Network Repository Function); and/or E-SMLC (Evolved Serving Mobile Location Center). These are merely exemplary core network functionality that may be provided by the core network 90, and note that both 5G and LTE core network functionality might be provided by the core network 90. The base station 70 is coupled via a backhaul link 31 to the core network 90. The base station 70 and the core network 90 may include an NG (Next Generation) interface for 5G, or an S1 interface for LTE, or other suitable interface for other radio access technologies for communicating via the backhaul link 31.

In the data network 91, there is a computer-readable medium 94. The computer-readable medium 94 contains instructions that, when downloaded and installed into the memories 15, 75, or 95 of the corresponding UE 10, base station 70, and/or core network element(s) 90, and executed by processor(s) 13, 73, or 93, cause the respective device to perform corresponding actions described herein. The computer-readable medium 94 may be implemented in other forms, such as via a compact disc or memory stick.

The programs 12, 72, and 92 contain instructions stored by corresponding one or more memories 15, 75, or 95. These instructions, when executed by the corresponding one or more processors 13, 73, or 93, cause the corresponding apparatus 10, 70, or 90, to perform the operations described herein. The computer readable memories 15, 75, or 95 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 15, 75, and 95 may be means for performing storage functions. The processors 13, 73, and 93, may be of any type suitable to the local technical environment, and may include one or more of general-purpose computers, special purpose computers, microprocessors, digital signal processors (DSPs) and processors based on a multi-core processor architecture, as non-limiting examples. The processors 13, 73, and 93 may be means for causing their respective apparatus to perform functions, such as those described herein.

The receivers 17, 77, and 97, and the transmitters 18, 78, and 98 may implement wired or wireless interfaces. The receivers and transmitters may be grouped together as transceivers.

The cellular network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities (such as network functions 99) that result from the network virtualization are still implemented, at some level, using hardware such as processors 73 and/or 93 and memories 75 and/or 95, and also such virtualized entities create technical effects.

In general, the various embodiments of the user equipment 10 can include, but are not limited to, cellular telephones (such as smart phones, mobile phones, cellular phones, voice over Internet Protocol (IP) (VoIP) phones, and/or wireless local loop phones), tablets, portable computers, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the UE 10 could be any end device that may be capable of wireless communication. By way of example rather than limitation, the UE may also be referred to as a communication device, terminal device (MT), a Subscriber Station (SS), a Portable Subscriber Station, a Mobile Station (MS), or an Access Terminal (AT).

Without in any way limiting the scope, interpretation, or application of the claims appearing below, a technical effect and/or advantage of one or more of the example embodiments disclosed herein is the techniques allow for a larger WUS group with reduced energy impacts for the UEs in this group. Another technical effect and/or advantage of one or more of the example embodiments disclosed herein is the techniques allow UEs using/monitoring WUS to avoid unnecessary MR transitions from active state to sleep state (transitions consume more power). Another technical effect and/or advantage of one or more of the example embodiments disclosed herein is the techniques allow for less robust WUS detection, i.e., if a UE is woken up by a noise-like WUS, the impact on its deep sleep state would be minimized. Less robust WUS allows for larger coverage areas of WUS and hence makes deep sleep energy saving states applicable to more UEs, which is vital considering 80% of the traffic is indoor and these UEs experience high building entry losses (which are propagation losses from the radio frequency, RF, signal having to penetrate through the building, also known as indoor losses or outdoor to indoor propagation losses).

The following are additional examples.

Example 1. A method, comprising: receiving, by a user equipment in a sleep state, a wake up signal; monitoring, by the user equipment responsive to reception of the wake up signal, one or more paging occasions, the monitoring comprising: receiving a paging message; determining the received paging message is not addressed to the user equipment; and determining whether another paging occasion should be monitored based at least on paging records in the paging message; and reentering by the user equipment the sleep state in response to a determination it is not necessary to monitor another paging occasion.

Example 2. The method according to example 1, where in the determining whether another paging occasion should be monitored comprises determining it is not necessary to monitor another paging occasion based on a number of paging records in the paging message being less than a number of maximum paging records per paging message.

Example 3. The method according to example 1, where determining whether another paging occasion should be monitored comprises determining another paging occasion should be monitored based on a number of paging records in the paging message being equal to a maximum number of paging records per paging message.

Example 4. The method according to example 1, where determining whether another paging occasion should be monitored comprises determining another paging occasion should be monitored based on a number of paging records in the paging message being equal to a maximum number of paging records per paging message and paging records in the paging message are different from paging records as in a previous paging message.

Example 5. The method according to any of examples 3 or 4, wherein the method further comprises monitoring another paging occasion.

Example 6. The method according to example 1, where determining whether another paging occasion should be monitored comprises determining it is not necessary to monitor another paging occasion based on a number of paging records in the paging message being equal to a maximum number of paging records per paging message and paging records in the paging message are the same as paging records as in a previous paging message.

Example 7. The method according to any of examples 2 to 6, where the number of maximum paging records per paging message is configured by a network to which the user equipment communicates.

Example 8. The method according to example 7, where the network configures the number of paging records in the paging message to be used as a threshold for determining a paging monitoring decision, the paging monitoring decision comprising the determining whether another paging occasion should be monitored based at least on paging records in the paging message.

Example 9. The method according to example 7, where the number of maximum paging records per paging message is configured by the network using one of dedicated or broadcast signaling.

Example 10. The method according to any of examples 2 to 6, where the number of maximum paging records per paging message is determined by the user equipment based on a coding rate employed for the paging message and paging record size for the paging message.

Example 11. A method, comprising: receiving, at a network node from a user equipment, indication of a capability to transition out of a sleep state via a wake up signal to return to a sleep state based on paging message monitoring; determining, by the network node based on the capability and on a need to transmit a paging message to the user equipment, a sleep state of the user equipment; and transmitting, by the network node to the user equipment, either a wake up signal or paging message based on the determined sleep state.

Example 12. The method according to example 11, wherein the determining the sleep state is based on information about paging messages transmitted to other user equipment.

Example 13. The method according to example 12, wherein the information comprises a maximum number of paging records per paging message.

Example 14. The method according to example 13, wherein the information comprises indication whether paging records in a previous paging message are different from paging records in a current paging message.

Example 15. The method according to any of examples 12 to 14, wherein transmitting the wake up signal to the user equipment is performed in response to one of the following: a number of paging records in a previous paging message is less than a maximum number of configured or determined paging records for per paging message; or a number of paging records in the previous paging message is equal to the maximum number of configured or determined paging records per paging message and paging records in the previous paging message are the same as paging records in a paging message transmitted prior to the previous paging message.

Example 16. The method according to example 11, wherein the determining the sleep state is based at least on a received indication the user equipment is in a sleep state.

Example 17. The method according to any of examples 11 to 16, wherein transmitting the paging message to the user equipment is based on a determination the user equipment is not in a sleep state and is instead in an awake state.

Example 18. The method according to example 17, wherein the determination the user equipment is not in the sleep state and is instead in the awake state is made because a wake up signal has been transmitted to the user equipment after one paging occasion but prior to a next paging occasion occurring.

Example 19. A computer program, comprising instructions for performing the methods of any of examples 1 to 18, when the computer program is run on an apparatus.

Example 20. The computer program according to example 19, wherein the computer program is a computer program product comprising a computer-readable medium bearing instructions embodied therein for use with the apparatus.

Example 21. The computer program according to example 19, wherein the computer program is directly loadable into an internal memory of the apparatus.

Example 22. An apparatus, comprising means for performing: receiving, by a user equipment in a sleep state, a wake up signal; monitoring, by the user equipment responsive to reception of the wake up signal, one or more paging occasions, the monitoring comprising: receiving a paging message; determining the received paging message is not addressed to the user equipment; and determining whether another paging occasion should be monitored based at least on paging records in the paging message; and reentering by the user equipment the sleep state in response to a determination it is not necessary to monitor another paging occasion.

Example 23. The apparatus according to example 22, where in the determining whether another paging occasion should be monitored comprises determining it is not necessary to monitor another paging occasion based on a number of paging records in the paging message being less than a number of maximum paging records per paging message.

Example 24. The apparatus according to example 22, where determining whether another paging occasion should be monitored comprises determining another paging occasion should be monitored based on a number of paging records in the paging message being equal to a maximum number of paging records per paging message.

Example 25. The apparatus according to example 22, where determining whether another paging occasion should be monitored comprises determining another paging occasion should be monitored based on a number of paging records in the paging message being equal to a maximum number of paging records per paging message and paging records in the paging message are different from paging records as in a previous paging message.

Example 26. The apparatus according to any of examples 24 or 25, wherein the means are further configured for performing: monitoring another paging occasion.

Example 27. The apparatus according to example 22, where determining whether another paging occasion should be monitored comprises determining it is not necessary to monitor another paging occasion based on a number of paging records in the paging message being equal to a maximum number of paging records per paging message and paging records in the paging message are the same as paging records as in a previous paging message.

Example 28. The apparatus according to any of examples 23 to 27, where the number of maximum paging records per paging message is configured by a network to which the user equipment communicates.

Example 29. The apparatus according to example 28, where the network configures the number of paging records in the paging message to be used as a threshold for determining a paging monitoring decision, the paging monitoring decision comprising the determining whether another paging occasion should be monitored based at least on paging records in the paging message.

Example 30. The apparatus according to example 28, where the number of maximum paging records per paging message is configured by the network using one of dedicated or broadcast signaling.

Example 31. The apparatus according to any of examples 23 to 27, where the number of maximum paging records per paging message is determined by the user equipment based on a coding rate employed for the paging message and paging record size for the paging message.

Example 32. An apparatus, comprising means for performing: receiving, at a network node from a user equipment, indication of a capability to transition out of a sleep state via a wake up signal to return to a sleep state based on paging message monitoring; determining, by the network node based on the capability and on a need to transmit a paging message to the user equipment, a sleep state of the user equipment; and transmitting, by the network node to the user equipment, either a wake up signal or paging message based on the determined sleep state.

Example 33. The apparatus according to example 32, wherein the determining the sleep state is based on information about paging messages transmitted to other user equipment.

Example 34. The apparatus according to example 33, wherein the information comprises a maximum number of paging records per paging message.

Example 35. The apparatus according to example 34, wherein the information comprises indication whether paging records in a previous paging message are different from paging records in a current paging message.

Example 36. The apparatus according to any of examples 33 to 35, wherein transmitting the wake up signal to the user equipment is performed in response to one of the following: a number of paging records in a previous paging message is less than a maximum number of configured or determined paging records for per paging message; or a number of paging records in the previous paging message is equal to the maximum number of configured or determined paging records per paging message and paging records in the previous paging message are the same as paging records in a paging message transmitted prior to the previous paging message.

Example 37. The apparatus according to example 32, wherein the determining the sleep state is based at least on a received indication the user equipment is in a sleep state.

Example 38. The apparatus according to any of examples 32 to 37, wherein transmitting the paging message to the user equipment is based on a determination the user equipment is not in a sleep state and is instead in an awake state.

Example 39. The apparatus according to example 38, wherein the determination the user equipment is not in the sleep state and is instead in the awake state is made because a wake up signal has been transmitted to the user equipment after one paging occasion but prior to a next paging occasion occurring.

Example 40. The apparatus of any preceding apparatus example, wherein the means comprises: at least one processor; and at least one memory storing instructions that, when executed by at least one processor, cause the performance of the apparatus.

Example 41. An apparatus, comprising: one or more processors; and one or more memories storing instructions that, when executed by the one or more processors, cause the apparatus at least to perform: receiving, by a user equipment in a sleep state, a wake up signal; monitoring, by the user equipment responsive to reception of the wake up signal, one or more paging occasions, the monitoring comprising: receiving a paging message; determining the received paging message is not addressed to the user equipment; and determining whether another paging occasion should be monitored based at least on paging records in the paging message; and reentering by the user equipment the sleep state in response to a determination it is not necessary to monitor another paging occasion.

Example 42. The apparatus according to example 41, where in the determining whether another paging occasion should be monitored comprises determining it is not necessary to monitor another paging occasion based on a number of paging records in the paging message being less than a number of maximum paging records per paging message.

Example 43. The apparatus according to example 41, where determining whether another paging occasion should be monitored comprises determining another paging occasion should be monitored based on a number of paging records in the paging message being equal to a maximum number of paging records per paging message.

Example 44. The apparatus according to example 41, where determining whether another paging occasion should be monitored comprises determining another paging occasion should be monitored based on a number of paging records in the paging message being equal to a maximum number of paging records per paging message and paging records in the paging message are different from paging records as in a previous paging message.

Example 45. The apparatus according to any of examples 43 or 44, wherein the one or more memories further store instructions that, when executed by the one or more processors, cause the apparatus at least to perform: monitoring another paging occasion.

Example 46. The apparatus according to example 41, where determining whether another paging occasion should be monitored comprises determining it is not necessary to monitor another paging occasion based on a number of paging records in the paging message being equal to a maximum number of paging records per paging message and paging records in the paging message are the same as paging records as in a previous paging message.

Example 47. The apparatus according to any of examples 42 to 46, where the number of maximum paging records per paging message is configured by a network to which the user equipment communicates.

Example 48. The apparatus according to example 47, where the network configures the number of paging records in the paging message to be used as a threshold for determining a paging monitoring decision, the paging monitoring decision comprising the determining whether another paging occasion should be monitored based at least on paging records in the paging message.

Example 49. The apparatus according to example 47, where the number of maximum paging records per paging message is configured by the network using one of dedicated or broadcast signaling.

Example 50. The apparatus according to any of examples 42 to 46, where the number of maximum paging records per paging message is determined by the user equipment based on a coding rate employed for the paging message and paging record size for the paging message.

Example 51. An apparatus, comprising: one or more processors; and one or more memories storing instructions that, when executed by the one or more processors, cause the apparatus at least to perform: receiving, at a network node from a user equipment, indication of a capability to transition out of a sleep state via a wake up signal to return to a sleep state based on paging message monitoring; determining, by the network node based on the capability and on a need to transmit a paging message to the user equipment, a sleep state of the user equipment; and transmitting, by the network node to the user equipment, either a wake up signal or paging message based on the determined sleep state.

Example 52. The apparatus according to example 51, wherein the determining the sleep state is based on information about paging messages transmitted to other user equipment.

Example 53. The apparatus according to example 52, wherein the information comprises a maximum number of paging records per paging message.

Example 54. The apparatus according to example 53, wherein the information comprises indication whether paging records in a previous paging message are different from paging records in a current paging message.

Example 55. The apparatus according to any of examples 52 to 54, wherein transmitting the wake up signal to the user equipment is performed in response to one of the following: a number of paging records in a previous paging message is less than a maximum number of configured or determined paging records for per paging message; or a number of paging records in the previous paging message is equal to the maximum number of configured or determined paging records per paging message and paging records in the previous paging message are the same as paging records in a paging message transmitted prior to the previous paging message.

Example 56. The apparatus according to example 51, wherein the determining the sleep state is based at least on a received indication the user equipment is in a sleep state.

Example 57. The apparatus according to any of examples 51 to 56, wherein transmitting the paging message to the user equipment is based on a determination the user equipment is not in a sleep state and is instead in an awake state.

Example 58. The apparatus according to example 57, wherein the determination the user equipment is not in the sleep state and is instead in the awake state is made because a wake up signal has been transmitted to the user equipment after one paging occasion but prior to a next paging occasion occurring.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 4. A computer-readable medium may comprise a computer-readable storage medium (e.g., memories 15, 75, and 95 or other device) that may be any media or means that can contain, store, and/or transport the instructions for use by or in connection with an instruction execution system, apparatus, or device, such as a computer. A computer-readable storage medium does not comprise propagating signals, and therefore may be considered to be non-transitory signals. The term "non-transitory", as used herein, is a limitation of the medium itself (i.e., tangible, not a signal) as opposed to a limitation on data storage persistency (e.g., RAM, random access memory, versus ROM, read-only memory).

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

5G fifth generation
AMF access and mobility management function
DRX
E-SMLC evolved serving mobile location center
GMLC Gateway Mobile Location Center
eNB (or eNodeB) evolved Node B (e.g., an LTE base station)
gNB (or gNodeB) base station for 5G/NR
I/F interface
IoT Internet of things
KPI key performance indicator
LMF Location Management Function
LP low power
LR LP-WUR, low power wake up radio
LTE long term evolution
max or MAX maximum
min minimum
MME mobility management entity
MR main radio
NF network function
ng or NG next generation
NR new radio
NRF Network Repository Function
N/W or NW network
PO paging occasion
PRB physical resource block
RAN radio access network
Rx or RX receiver
SGW serving gateway
SMF session management function
TRP transmission-reception point
Tx or TX transmitter
UDM unified data management
UDR unified data repository
UE user equipment (e.g., a wireless, typically mobile device)
UPF user plane function
WUS wake up signal
WUR wake up radio
XR extended reality

What is claimed is:
1. A method, comprising:
receiving, by a user equipment in a sleep state, a wake up signal;

monitoring, by the user equipment responsive to reception of the wake up signal, one or more paging occasions, the monitoring comprising:
receiving a paging message;
determining the received paging message is not addressed to the user equipment; and
determining whether another paging occasion should be monitored based at least on paging records in the paging message; and
reentering by the user equipment the sleep state in response to a determination it is not necessary to monitor another paging occasion.

2. An apparatus, comprising:
one or more processors; and
one or more memories storing instructions that, when executed by the one or more processors, cause the apparatus at least to perform:
receiving, by a user equipment in a sleep state, a wake up signal;
monitoring, by the user equipment responsive to reception of the wake up signal, one or more paging occasions, the monitoring comprising:
receiving a paging message;
determining the received paging message is not addressed to the user equipment; and
determining whether another paging occasion should be monitored based at least on paging records in the paging message; and
reentering by the user equipment the sleep state in response to a determination it is not necessary to monitor another paging occasion.

3. The apparatus according to claim 2, where in the determining whether another paging occasion should be monitored comprises determining it is not necessary to monitor another paging occasion based on a number of paging records in the paging message being less than a number of maximum paging records per paging message.

4. The apparatus according to claim 2, where determining whether another paging occasion should be monitored comprises determining another paging occasion should be monitored based on a number of paging records in the paging message being equal to a maximum number of paging records per paging message.

5. The apparatus according to claim 2, where determining whether another paging occasion should be monitored comprises determining another paging occasion should be monitored based on a number of paging records in the paging message being equal to a maximum number of paging records per paging message and paging records in the paging message are different from paging records as in a previous paging message.

6. The apparatus according to claim 4, wherein the one or more memories further store instructions that, when executed by the one or more processors, cause the apparatus at least to perform: monitoring another paging occasion.

7. The apparatus according to claim 2, where determining whether another paging occasion should be monitored comprises determining it is not necessary to monitor another paging occasion based on a number of paging records in the paging message being equal to a maximum number of paging records per paging message and paging records in the paging message are the same as paging records as in a previous paging message.

8. The apparatus according to claim 3, where the number of maximum paging records per paging message is configured by a network to which the user equipment communicates.

9. The apparatus according to claim 8, where the network configures the number of paging records in the paging message to be used as a threshold for determining a paging monitoring decision, the paging monitoring decision comprising the determining whether another paging occasion should be monitored based at least on paging records in the paging message.

10. The apparatus according to claim 8, where the number of maximum paging records per paging message is configured by the network using one of dedicated or broadcast signaling.

11. The apparatus according to claim 3, where the number of maximum paging records per paging message is determined by the user equipment based on a coding rate employed for the paging message and paging record size for the paging message.

12. An apparatus, comprising:

one or more processors; and one or more memories storing instructions that, when executed by the one or more processors, cause the apparatus at least to perform:

receiving, at a network node from a user equipment, indication of a capability to transition out of a sleep state via a wake up signal to return to a sleep state based on paging message monitoring;

determining, by the network node based on the capability and on a need to transmit a paging message to the user equipment, a sleep state of the user equipment; and transmitting, by the network node to the user equipment, either a wake up signal or paging message based on the determined sleep state.

13. The apparatus according to claim 12, wherein the determining the sleep state is based on information about paging messages transmitted to other user equipment.

14. The apparatus according to claim 13, wherein the information comprises a maximum number of paging records per paging message.

15. The apparatus according to claim 14, wherein the information comprises indication whether paging records in a previous paging message are different from paging records in a current paging message.

16. The apparatus according to claim 13, wherein transmitting the wake up signal to the user equipment is performed in response to one of the following:

a number of paging records in a previous paging message is less than a maximum number of configured or determined paging records for per paging message; or a number of paging records in the previous paging message is equal to the maximum number of configured or determined paging records per paging message and paging records in the previous paging message are the same as paging records in a paging message transmitted prior to the previous paging message.

17. The apparatus according to claim 12, wherein the determining the sleep state is based at least on a received indication the user equipment is in a sleep state.

18. The apparatus according to claim 12, wherein transmitting the paging message to the user equipment is based on a determination the user equipment is not in a sleep state and is instead in an awake state.

19. The apparatus according to claim 18, wherein the determination the user equipment is not in the sleep state and is instead in the awake state is made because a wake up signal has been transmitted to the user equipment after one paging occasion but prior to a next paging occasion occurring.

* * * * *